United States Patent
Nentwig

(10) Patent No.: US 9,312,890 B2
(45) Date of Patent: Apr. 12, 2016

(54) WIRELESS COMMUNICATION

(71) Applicant: Broadcom Corporation, Irvine, CA (US)

(72) Inventor: Markus Nentwig, Helsinki (FI)

(73) Assignee: BROADCOM CORPORATION, Irvine, CA (US)

( * ) Notice: Subject to any disclaimer, the term of this patent is extended or adjusted under 35 U.S.C. 154(b) by 104 days.

(21) Appl. No.: 14/149,174

(22) Filed: Jan. 7, 2014

(65) Prior Publication Data

US 2014/0192718 A1 Jul. 10, 2014

(30) Foreign Application Priority Data

Jan. 8, 2013 (GB) .................... 1300279.5

(51) Int. Cl.
*H04W 24/02* (2009.01)
*H04W 76/02* (2009.01)
*H04B 7/26* (2006.01)
*H04B 1/04* (2006.01)

(52) U.S. Cl.
CPC ............ *H04B 1/0458* (2013.01); *H04B 1/0475* (2013.01)

(58) Field of Classification Search
None
See application file for complete search history.

(56) References Cited

U.S. PATENT DOCUMENTS

| 8,699,620 | B1 * | 4/2014 | Wu | 375/297 |
|---|---|---|---|---|
| 2005/0136868 | A1 * | 6/2005 | Jun et al. | 455/127.1 |
| 2009/0232260 | A1 * | 9/2009 | Hayashi et al. | 375/346 |
| 2011/0158346 | A1 * | 6/2011 | Ballantyne | 375/296 |
| 2011/0281579 | A1 * | 11/2011 | Kummetz | 455/424 |
| 2013/0064146 | A1 | 3/2013 | Ahn et al. | |
| 2013/0077502 | A1 * | 3/2013 | Gainey et al. | 370/252 |
| 2014/0094214 | A1 * | 4/2014 | Meyer et al. | 455/522 |

FOREIGN PATENT DOCUMENTS

| WO | 2011026705 | 3/2011 |
|---|---|---|
| WO | 2011145857 | 11/2011 |

OTHER PUBLICATIONS

3GPP TR 22.803 v12.0.0 (Dec. 2012); Feasibility study for Proximity Services (ProSe); downloaded Feb. 7, 2013 from: http://www.3gpp.org/ftp /Specs/archive/22_series/22.803/ see particularly 3.1 Definitions , 4.1 Data path s for ProSe Communications, and figure 2.(40 pages).

Huawei, Future smartphone solution White Paper, issue 2.0, Sep. 17, 2012 (32 pages).

* cited by examiner

*Primary Examiner* — Chi H Pham
*Assistant Examiner* — Soon-Dong D Hyun
(74) *Attorney, Agent, or Firm* — Oblon, McClelland, Maier & Neustadt, L.L.P.

(57) ABSTRACT

Communication apparatus, method and computer program product for communication in a communication system. While a transmitter of a transceiver module of a user equipment is transmitting, a first receiver is operated on a first received signal, and a second receiver is operated on a transmitted signal from the transmitter. While the transmitter is not transmitting, the second receiver is operated on a second received signal.

21 Claims, 6 Drawing Sheets

WIRELESS COMMUNICATION

CROSS REFERENCE TO RELATED APPLICATION

This application claims benefit under 35 U.S.C. §119(a) and 37 CFR 1.55 to UK patent application no. GB1300279.5, filed on 8 Jan. 2013, the entire content of which is hereby incorporated by reference.

TECHNICAL FIELD

The present disclosure relates generally to wireless communication. In particular, but not exclusively, the present disclosure relates to techniques for Device-to-Device communication in a communication system, thereby increasing communication capacity.

BACKGROUND

Mobile data transmission and data services are constantly making progress, wherein such services provide various communication services, such as voice, video, packet data, messaging, broadcast, etc. In a conventional communication network, such as a cellular network system, data is usually transmitted via a base station or any other central network element to user equipments UEs for achieving communication between the user equipments.

However, in order to increase the capacity of such communication networks, it has been proposed to create a direct communication link between two or more network elements, such as UEs, e.g. when the respective network elements are close to each other. Thereby, user devices may directly communicate with each via a direct UE-to-UE communication instead of conveying data from one network element to another network element via a base station.

According to recent studies, such as with regard to Long Term Evolution LTE™ standardization and ProSE/D2D (device-to-device), UEs communicate directly with other UEs. Apparently, this is planned in frequency division duplex FDD radio bands, where uplink and downlink operate on different frequencies.

Conventionally, a frequency division duplex user equipment FDD UE has no means to receive transmissions from other UEs, as its receiver uses filters close to the antenna, such as duplex-/preselect filter, to protect the receiver from the UE's own transmitted signal.

A possible solution would be to re-route signals in the frontend. However, such an approach is impractical, as there would be the need for a cross-over between high-power transmission (Tx) and low noise reception (Rx) signals.

There is therefore a need to improve strategies for providing Device-to-Device communication in a communication system.

SUMMARY

In accordance with first embodiments, there is apparatus for use in wireless communication, the apparatus including:
 a transmitter;
 a first receiver;
 a second receiver; and
 at least one processor; and
 at least one memory including computer program code,
 the at least one memory and the computer program code being configured to, with the at least one processor, cause the apparatus at least to:
  while the transmitter is transmitting:
   operate the first receiver on a first received signal; and
   operate the second receiver on a signal transmitted from the transmitter; and
  while the transmitter is not transmitting:
   operate the second receiver on a second received signal.

In accordance with second embodiments, there is a method for use in wireless communication, the method including:
 while a transmitter is transmitting:
  operating a first receiver on a first received signal; and
  operating a second receiver on a signal transmitted from the transmitter, and
 while the transmitter is not transmitting:
  operating the second receiver on a second received signal,
 wherein the transmitter, first receiver and second receiver are comprised within a single transceiver module.

In accordance with third embodiments, there is a computer program product including a non-transitory computer-readable storage medium having computer readable instructions stored thereon, the computer readable instructions being executable by a computerized device to cause the computerized device to perform a method according the second embodiments.

According to embodiments, there is an apparatus, which includes means for, while a transmitter is transmitting, operating a first receiver on a first received signal, means for, while the transmitter is transmitting, operating a second receiver on a transmitted signal from the transmitter, and means for, while the transmitter is not transmitting, operating the second receiver on a second received signal.

Further features embodiments will become apparent from the following description of preferred embodiments, given by way of example only, which is made with reference to the accompanying drawings.

BRIEF DESCRIPTION OF THE DRAWINGS

For a more complete understanding of embodiments of the present disclosure, reference is now made to the following descriptions taken in connection with the accompanying drawings in which.

DETAILED DESCRIPTION

Example aspects of the present disclosure will be described herein below. More specifically, example aspects of the present disclosure are described hereinafter with reference to particular non-limiting examples. A person skilled in the art will appreciate that embodiments are by no means limited to these examples, and may be more broadly applied.

It is to be noted that the following description of the present disclosure and its embodiments mainly refers to specifications being used as non-limiting examples for certain example network configurations and deployments. Namely, the present disclosure and its embodiments are mainly described in relation to 3GPP specifications being used as non-limiting examples for certain example network configurations and deployments. In particular, a LTE™ communication system is used as a non-limiting example for the applicability of thus described embodiments. As such, the description of embodiments given herein specifically refers to terminology which is directly related thereto. Such terminology is only used in the context of the presented non-limiting examples, and naturally does not limit embodiments in any way. Rather, any other network configuration or system deployment, etc. may also be utilized as long as compliant with the features described herein.

Hereinafter, various embodiments and implementations of the present disclosure and its aspects or embodiments are described using several alternatives. It is generally noted that, according to certain needs and constraints, all of the described alternatives may be provided alone or in any conceivable combination (also including combinations of individual features of the various alternatives).

According to certain embodiments of the present disclosure, a transceiver used in a user equipment UE may include a measurement receiver to sense its own transmitted signal and reflections from the antenna.

For example, such transceiver may contain a measurement receiver for antenna tuning purposes so as to minimize reflections at the antenna and to improve transmitter efficiency. Other possible use cases for the measurement receiver are calibration of an envelope tracking transmitter, and adaptive predistortion, for example.

As the measurement receiver's main purpose is to sense the UE's own transmitted signal, it is able to operate at uplink frequencies, whereas the main-/diversity receivers in a transceiver are designed for downlink frequencies.

According to certain embodiments of the present disclosure, receiving device-to-device D2D transmissions on an uplink band in a user equipment UE with a measurement receiver is enabled.

Thereby, according to certain embodiments, the following cases are applicable.

Figure 1:
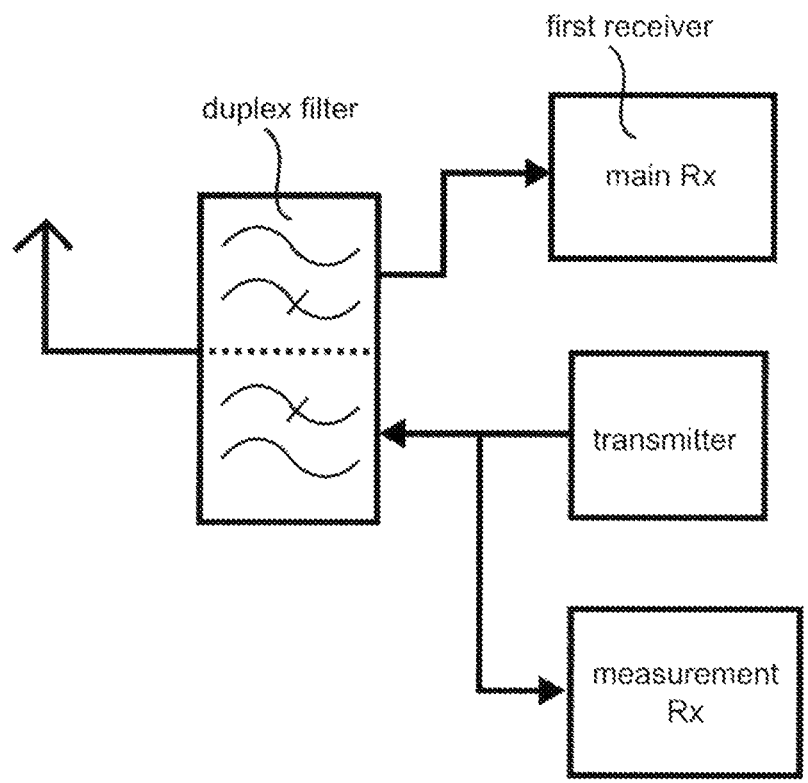
FIG. 1 schematically shows a transceiver module of a user equipment according to certain embodiments of the present disclosure.

FIG. 1 schematically shows a transceiver module of a user equipment according to certain embodiments of the present disclosure. The transceiver module includes a main receiver (main Rx), a transmitter and a measurement receiver (measurement Rx). The dataflow from/to the transmitter and the main receiver is processed by means of a duplex filter, so as to achieve adequate frequency division multiplexing, for example. The duplex filter may implement frequency division multiplexing by coupling received signals in a downlink band (for example 2110 to 2170 MHz) from antenna to first receiver, coupling transmitted signals in an uplink band (for example 1920 to 1980 MHz) from transmitter to antenna and by rejecting signals in other frequency bands.

According to certain embodiments of the present disclosure, as is also indicated by arrows shown in FIG. 1, while the transmitter is transmitting (i.e. is operated in transmission mode), the main receiver, which is also referred to as a first receiver, operates on a first received signal. Furthermore, while the transmitter is transmitting, the second receiver operates on a signal transmitted from the transmitter. Otherwise, while the transmitter is not transmitting, the second receiver operates on a second received signal.

Figure 2:
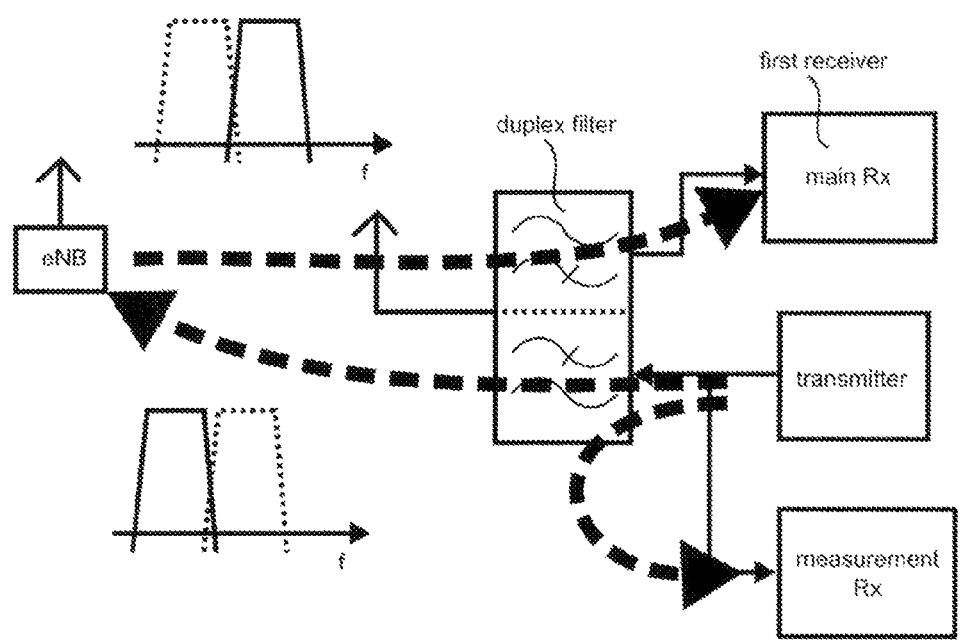
FIG. 2 shows a signal flow in the transceiver module of FIG. 1 when the transmitter is transmitting signals.

Further, as is illustrated in FIG. 2, the first received signal is received in a downlink operating band and originates from a base station (eNB).

In particular, FIG. 2 shows the transceiver structure of FIG. 1 including a main receiver (main Rx), a transmitter and a measurement receiver (measurement Rx), as well as a duplex filter for managing multiplexing. As is indicated by dashed arrows, a first signal originating from a base station is received by the main receiver when the transmitter is transmitting signals to e.g. the base station. In this case, i.e. when the transmitter is transmitting, the second receiver (the measurement receiver) operates on signals from the transmitter, so as to e.g. provide information for antenna tuning purposes.

Figure 3:
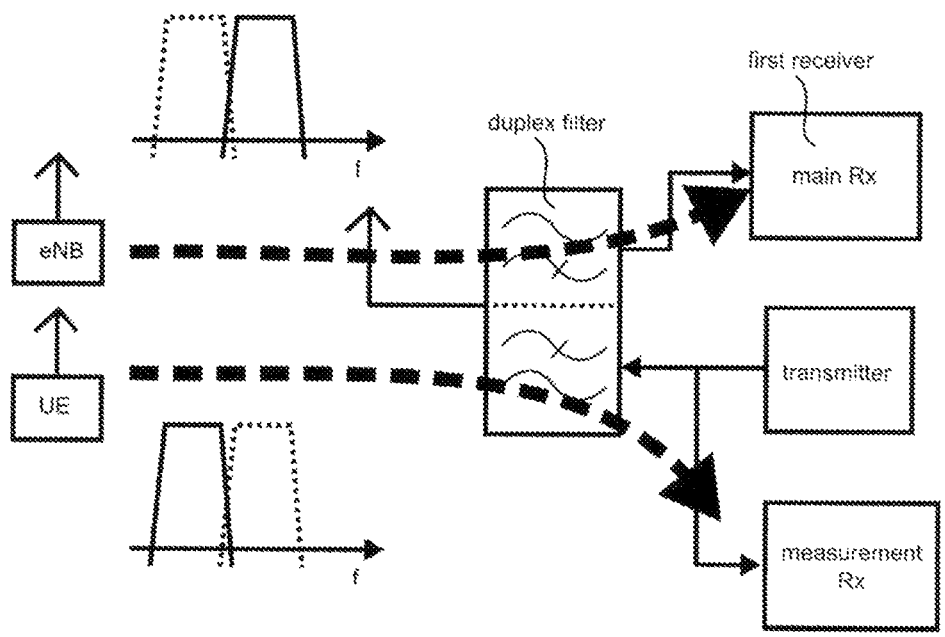
FIG. 3 shows a signal flow in the transceiver module of FIG. 1 when the transmitter is not transmitting signals.

FIG. 3 illustrates the case, where the second received signal is received in an uplink operating band and originates from a UE.

In particular, FIG. 3 again shows the transceiver structure of FIG. 1 including a main receiver (main Rx), a transmitter and a measurement receiver (measurement Rx), as well as a duplex filter for managing multiplexing. As is indicated by dashed arrows, a first signal originating from a base station may be received by the main receiver. Furthermore, when the transmitter is not transmitting, a second signal originating from a user equipment UE may be received by the measurement receiver (second receiver). That is, the second receiver operates on a second received signal originated from a UE, so as to provide UE-to-UE communication. Note that, when the transmitter is not transmitting, the UE from which the second signal originates is a UE other than (i.e. different from) the UE in which the main receiver, transmitter and measurement receiver are located.

Figure 4:
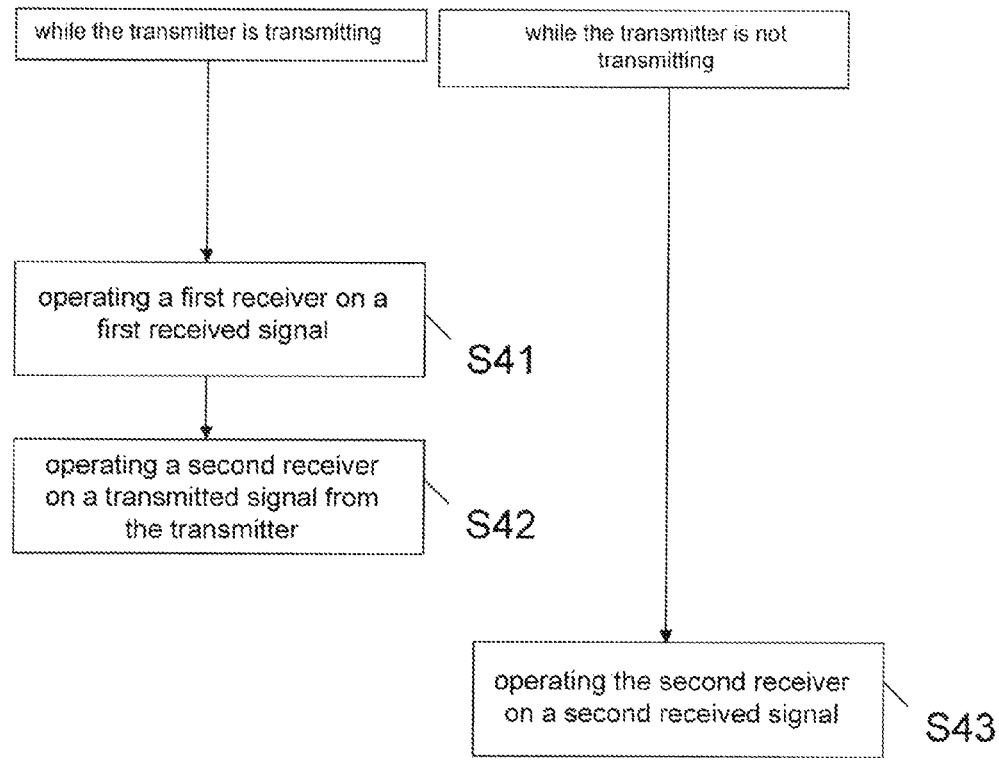
FIG. 4 shows a principle flowchart of an example method according to certain embodiments of the present disclosure.

FIG. 4 shows a principle flowchart of an example method according to certain embodiments of the present disclosure.

In Step S41, while a transmitter is transmitting, a first receiver operates on a first received signal.

In Step S42, while the transmitter is transmitting, a second receiver operates on a signal transmitted from the transmitter.

In Step S43, while the transmitter is not transmitting, the second receiver operates on a second received signal.

Figure 5:
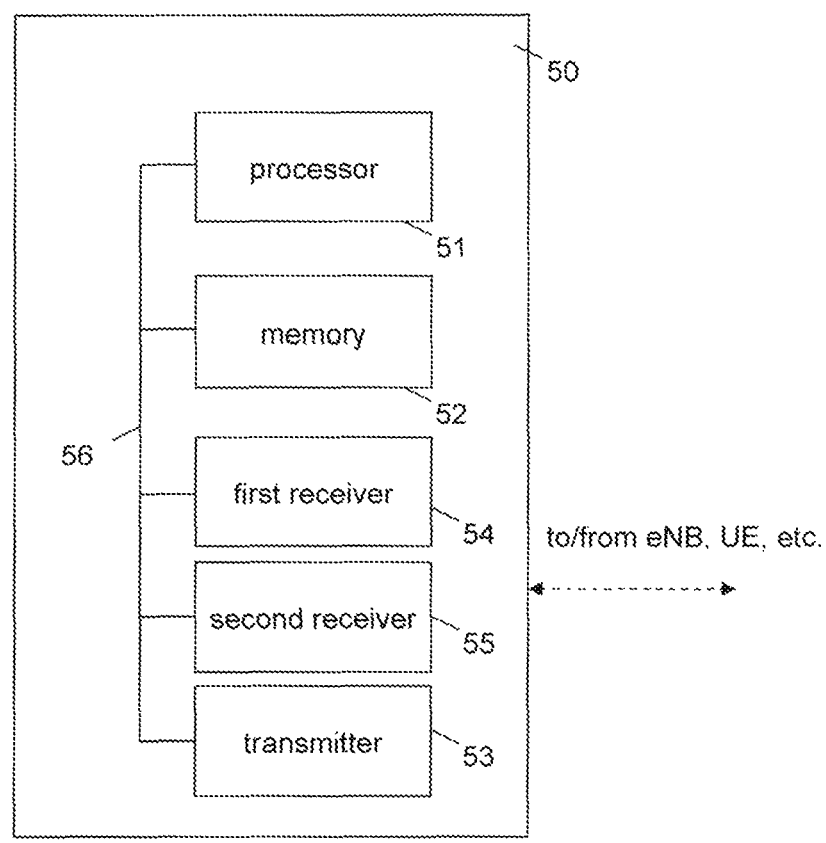
FIG. 5 shows a principle configuration of an example apparatus according to certain embodiments of the present disclosure.

FIG. 5 shows a principle configuration of an example apparatus according to certain embodiments of the present disclosure. The apparatus 50 includes, linked via a bus 56 or the like, a transmitter 53, a first receiver 54, a second receiver 55, a processing system and/or at least one processor 51, and at least one memory 52 including computer program code, the at least one memory and the computer program code configured to, with the at least one processor, cause the apparatus at least to perform, while the transmitter 53 is transmitting, operating the first receiver 54 on a first received signal, and operating the second receiver 55 on a transmitted signal from the transmitter 53, and, while the transmitter 53 is not transmitting, operating the second receiver 55 on a second received signal.

According to certain embodiments of the present disclosure, the signal to the second receiver passes through a directional coupler. The directional coupler may be a separate component that is placed along the transmit signal path, for example between antenna and duplex filter, or between power amplifier and duplex filter. The directional coupler may be included in a power amplifier module, for example. The apparatus may include multiple couplers, for example a first coupler in a low-band transmit branch and a second coupler in a high-band transmit branch, that are chained by placing their coupled ports in a series arrangement.

Furthermore, according to certain embodiments of the present disclosure, the feature "operating the second receiver on a signal transmitted from the transmitter" includes e.g. antenna tuning and/or predistortion (conventional measurement Rx use cases), and/or the feature "operating the second receiver on a second received signal" includes e.g. reception of discovery signals and/or device-to-device D2D transmissions.

Still further, according to certain embodiments of the present disclosure, a (relatively) higher attenuation is applied to the signal received by the second receiver, when operating on the transmitted signal, and a (relatively) lower attenuation is applied, when operating on the second received signal.

According to a possible implementation of certain embodiments of the present disclosure, a directional coupler (providing coupled forward signal and coupled reflected signal) may be used.

The measurement receiver can be connected to either coupled forward signal CPL_IN or coupled reflected signal CPL_out, for example to sense the amplitude and phase of antenna reflections and tune antenna matching accordingly (conventional measurement Rx use case).

Figure 6:
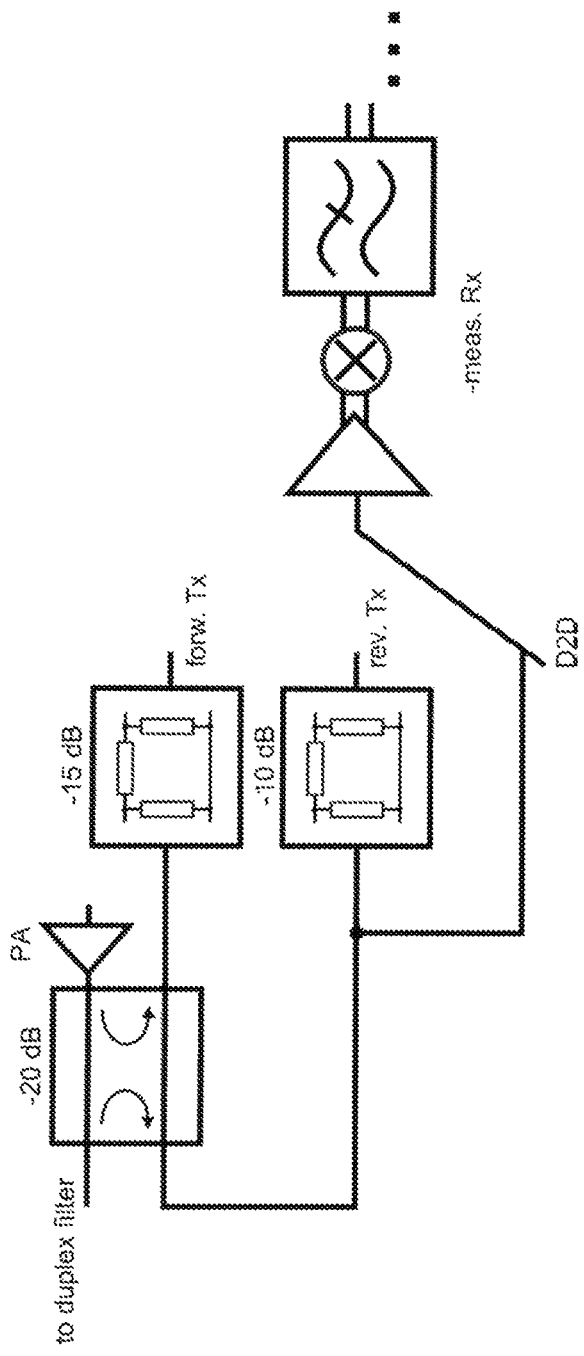
FIG. 6 illustrates a functional coupler and measurement receiver according to certain embodiments of the present disclosure.

FIG. 6 illustrates a functional coupler and measurement receiver according to certain embodiments of the present disclosure.

Thereby, a 15 dB attenuator may be used, when the measurement receiver senses the transmitted signal. The "forward" branch needs to be terminated accurately, as any unwanted reflections here would appear on the "reverse" branch. This attenuator may be part of the power amplifier module. Further, 10 to 15 dB attenuation may be used, when the measurement receiver senses antenna reflections. That is because the component of the transmit signal that is reflected at the antenna passes twice through the duplex filter. Assuming 2.5 dB minimum loss in either direction implies that 5 dB less attenuation are needed, 10 dB vs. 15 dB is used on the main branch. For D2D reception according to the present disclosure, the attenuator may be bypassed, so as to connect the measurement receiver directly to the coupler with as little attenuation as possible. Instead of the example switching arrangement as described in FIG. 6, an adjustable attenuator may be used for similar purposes.

To summarize, the present disclosure enables reception of frequency division multiplex device-to-device communication with relatively low overhead by using a second receiver to operate as measurement receiver when a transmission from a device's own transmitter is ongoing, and as radio link receiver when not.

In the foregoing example description of the apparatus, only the units that are relevant for understanding the principles of embodiments have been described using functional blocks. The apparatuses may include further units that are necessary for its respective function. However, a description of these units is omitted in this specification. The arrangement of the functional blocks of the apparatuses is not construed to limit embodiments, and the functions may be performed by one block or further split into sub-blocks.

According to embodiments of the present disclosure, a system may include any conceivable combination of the thus depicted devices/apparatuses and other network elements, which are arranged to cooperate as described above.

Embodiments of the present disclosure may be implemented in software, hardware, application logic or a combination of software, hardware, circuitry, and application logic. The software, application logic and/or hardware generally, but not exclusively, may reside on the devices' modem module. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors or a processing system) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The present disclosure relates in particular but without limitation to mobile communications, for example to environments under UMTS, LTE™, WCDMA, WIMAX™ and WLAN and can be implemented for example in user equipments or smart phones, or personal computers connectable to such networks. That is, it can be implemented as/in chipsets to connected devices, and/or modems thereof.

If desired, the different functions discussed herein may be performed in a different order and/or concurrently with each other. Furthermore, if desired, one or more of the above-described functions may be optional or may be combined.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which are defined in the accompanying claims.

The following meanings for the abbreviations used in this specification apply:
D2D: Device-to-device
eNB: Base station
FDD: Frequency Division Duplex
UE: User equipment
PA: Power amplifier
Rx: Receive(r)
Tx: Transmit(ter)

What is claimed is:
1. An apparatus comprising:
a transmitter;
a first receiver;
a second receiver;
and
circuitry configured to:
while the transmitter is transmitting:
operate the first receiver on a first received signal; and
operate the second receiver on a signal transmitted from the transmitter;
while the transmitter is not transmitting:

operate the second receiver on a second received signal;
apply a first attenuation to the signal received by the second receiver when operating on the transmitted signal; and
apply a second attenuation when operating on the second received signal, the second attenuation being lower than the first attenuation.

2. The apparatus of claim 1, wherein
the first receiver comprises a main receiver and the second receiver comprises a measurement receiver.

3. The apparatus of claim 1, wherein
the first received signal is received in a downlink operating band.

4. The apparatus of claim 3, wherein
the first received signal originates from a base station.

5. The apparatus of claim 1, wherein the second received signal is received in an uplink operating band.

6. The apparatus of claim 5, wherein
the second received signal originates from a user equipment.

7. The apparatus of claim 1, further comprising:
a directional coupler, wherein
the signal to the second receiver passes through the directional coupler.

8. The apparatus of claim 1, wherein
operating the second receiver on the signal transmitted from the transmitter comprises at least one of antenna tuning and predistortion setting.

9. The apparatus of claim 1, wherein
operating the second receiver on a second received signal comprises at least one of reception of discovery signals and device-to-device transmissions.

10. A non-transitory computer-readable storage medium having computer readable instructions stored thereon, the computer readable instructions being executable by a computerized device to cause the computerized device to:
while a transmitter is transmitting:
operate a first receiver on a first received signal; and
operate a second receiver on a signal transmitted from the transmitter, and
while the transmitter is not transmitting:
operate the second receiver on a second received signal, wherein
a first attenuation is applied to the signal received by the second receiver when operating on the transmitted signal, and a second attenuation, which is lower than the first attenuation, is applied when operating on the second received signal, and
the transmitter, first receiver and second receiver are comprised within a single transceiver module within the computerized device.

11. The apparatus of claim 1, wherein
the circuitry is configured to operate the second receiver only on a signal transmitted from the transmitter while the transmitter is transmitting.

12. A method for use in wireless communication, the method comprising:
while a transmitter is transmitting:
operating a first receiver on a first received signal; and
operating a second receiver on a signal transmitted from the transmitter, and
while the transmitter is not transmitting:
operating the second receiver on a second received signal, wherein
a first attenuation is applied to the signal received by the second receiver when operating on the transmitted signal, and a second attenuation, which is lower than the first attenuation, is applied when operating on the second received signal, and
the transmitter, first receiver and second receiver are comprised within a single transceiver module.

13. The method of claim 12, wherein
the first receiver comprises a main receiver and the second receiver comprises a measurement receiver.

14. The method of claim 12, wherein
the first received signal is received in a downlink operating band.

15. The method of claim 14, wherein
the first received signal originates from a base station.

16. The method of claim 12, wherein
the second received signal is received in an uplink operating band.

17. The method of claim 16, wherein
the second received signal originates from a user equipment.

18. The method of claim 12, wherein
the signal to the second receiver passes through a directional coupler.

19. The method of claim 12, wherein
operating the second receiver on the signal transmitted from the transmitter comprises at least one of antenna tuning and predistortion setting.

20. The method of claim 12, wherein
operating the second receiver on a second received signal comprises at least one of reception of discovery signals and device-to-device transmissions.

21. The apparatus of claim 1, wherein
the apparatus is a user equipment, and
the second received signal is a signal received from another user equipment while participating in device-to-device communications.

* * * * *